(12) United States Patent
Smith et al.

(10) Patent No.: US 8,986,046 B2
(45) Date of Patent: Mar. 24, 2015

(54) ELECTRICAL HARNESS ASSEMBLY FOR DUPLEX ACTIVATION FOR MOTOR VEHICLE RESTRAINT SYSTEMS

(71) Applicant: Autoliv ASP, Inc., Ogden, UT (US)

(72) Inventors: Bradley W. Smith, Plain City, UT (US); Ted J. Bertacini, Oxford, MI (US); Canice P. Boran, Northville, MI (US)

(73) Assignee: Autoliv ASP, Inc., Ogden, UT (US)

( * ) Notice: Subject to any disclaimer, the term of this patent is extended or adjusted under 35 U.S.C. 154(b) by 174 days.

(21) Appl. No.: 13/688,917

(22) Filed: Nov. 29, 2012

(65) Prior Publication Data
US 2014/0148056 A1    May 29, 2014

(51) Int. Cl.
*H01R 13/66*     (2006.01)

(52) U.S. Cl.
CPC ............................ *H01R 13/6658* (2013.01)
USPC .................................................. 439/620.22

(58) Field of Classification Search
USPC ..................... 439/620.22, 620.01, 620.15
See application file for complete search history.

(56) References Cited

U.S. PATENT DOCUMENTS

| | | | |
|---|---|---|---|
| 4,956,561 A * | 9/1990 | Tamer ......................... | 307/10.1 |
| 5,044,964 A * | 9/1991 | Minerd et al. ................. | 439/67 |
| 5,506,509 A | 4/1996 | Susak | |
| 6,079,739 A * | 6/2000 | Perotto et al. ................ | 280/736 |
| 6,106,010 A * | 8/2000 | Forbes et al. ................. | 280/741 |
| 6,418,853 B1 * | 7/2002 | Duguet et al. ............... | 102/206 |
| 6,571,712 B2 * | 6/2003 | Lebaudy et al. ........... | 102/202.5 |
| 7,063,570 B1 * | 6/2006 | Coyle et al. ............. | 439/620.26 |
| 7,352,556 B2 | 4/2008 | Miyake et al. | |
| 7,418,330 B2 | 8/2008 | Ooyabu | |
| 7,819,004 B2 | 10/2010 | Steele et al. | |
| 2006/0000948 A1 | 1/2006 | Ooyabu | |
| 2012/0221201 A1 | 8/2012 | Aoki | |
| 2012/0276761 A1 | 11/2012 | Martin et al. | |

FOREIGN PATENT DOCUMENTS

DE     10 2008 054 675 A1    6/2010

* cited by examiner

*Primary Examiner* — Neil Abrams
*Assistant Examiner* — Travis Chambers
(74) *Attorney, Agent, or Firm* — Brinks Gilson & Lione

(57) ABSTRACT

A duplex harness assembly for a motor vehicle airbag occupant restraint system. The system design incorporates a connector housing for connection via a cable with a restraint system controller. The connector housing having an integrated circuit provides a duplex restraint system control. The duplex control is provided by incorporating one or more electronic elements such as diodes mounted to the circuit. One or more electronic device attachments are remotely mounted from the connector housing via pairs of conductive wires.

21 Claims, 2 Drawing Sheets

ELECTRICAL HARNESS ASSEMBLY FOR DUPLEX ACTIVATION FOR MOTOR VEHICLE RESTRAINT SYSTEMS

FIELD OF THE INVENTION

The present invention relates an electrical harness assembly for motor vehicle safety systems, and more particularly to a duplex activation harness assembly for activation of two devices via a single circuit for motor vehicle airbag, occupant restraint systems.

BACKGROUND OF THE INVENTION

Safety standards for modern automotive vehicles are becoming increasingly strict. The result of heightened standards and innovations by designers of vehicle restraint systems is twofold: 1) occupants of vehicles are safer and less likely to suffer serious injury in a collision; and 2) manufacturers are held to higher standards with little opportunity to offset costs. As a result of these trends, innovations that increase safety while retaining efficiency and low production costs are essential to manufacturers of related technology.

Presently available motor vehicles include a number of systems designed to provide occupant restraint in a vehicle impact or rollover event. These systems include active seatbelt devices along with passive deployable restraint systems such as driver and passenger-side frontal impact airbags, and side curtain airbags. These systems include a number of deployable elements. In the case of airbags and side curtains, deployable elements include gas generators which produce inflation gas, and may further include additional elements such as controllable vents, tether releases, and other systems. Belt restraint systems also may include deployable elements such as pretensioning systems having micro gas generators, and inflatable seatbelts. A vehicle restraint system controller processes signals from a suite of sensors which enable the detection of a vehicle impact or rollover event. When certain dynamic criteria are present, a deployment command is directed to the various deployable systems. Deployable safety systems have produced significant benefits to occupants in vehicle impact and rollover situations.

Airbag systems typically are composed of a restraint system controller remotely mounted from a reaction canister. The reaction canister contains a folded airbag and an inflator with an initiator (squib). The inflator is connected to the restraint system controller via conductive wires and associated connectors. The total electrical path of these wires and connectors to and from the inflator is termed the "squib loop." Airbag deployment is commanded when vehicle acceleration sensors measure a threshold sufficient to warrant deployment. Upon this event, a signal is sent to the restraint system controller. The controller then provides sufficient energy to the inflator through the squib loop to initiate the discharge of inflator gas to inflate and deploy the airbag. Other systems including those mentioned previously may also be activated in connection with or instead of airbag deployment.

Historically, airbag safety restraint systems typically employed a single inflator device to release inflation gas for inflating a vehicle occupant restraint airbag in the event of a collision. For these systems, a single pair of connecting wires could be used. In response to increasingly complex performance specifications, inflatable restraint technology has led to the development of what has been termed "adaptive" or "smart" inflator devices and corresponding inflatable restraint systems. One popular adaptation of "smart" systems employs two stages (dual stage system) for inflators that typically utilize two separate initiator assemblies. Some other implementations include a single stage inflator and a tether release, a dual stage inflator (with two initiator connector pockets), and a single stage inflator with an active vent. The present implementations of "smart" systems have varying benefits, but they also have a common characteristic; each requires a multiple stage actuation circuit to actuate the individual devices. These systems are often referred to as duplex systems.

Common implementations of duplex systems utilize separate dedicated wires to activate or perform diagnostics on each individual device. The activation or diagnostic signals are sent from a restraint system controller to each device being commanded. Thus, the evolution of the technology to "smart" and duplex systems has led to an increase in the number of individual firing loops, connectors, output pins, and restraint control module connectors required for providing airbag activation. As a result, such duplex systems typically have larger size, weight, and more complex operation than their single stage counterparts.

In an effort to minimize the complexity and reduce wiring and connection cost, duplex systems have combined multiple firing loops into a single wiring loop path. This design approach is lighter and more efficient in design, but has also introduced some non-linear electrical components in the firing loop to provide for isolation of the individual squibs or other active elements. The additional non-linear components, added to isolate individual squibs or other active elements, can be diodes or other non-linear components. Combining the activation loops has made the "smart" systems require less conducting wire, but current systems remain difficult to assemble and customize for the various devices that may be activated.

As a result of additional control circuitry for the various devices activated using duplex systems, harness assemblies for the various designs are once again becoming increasingly complex. The increased complexity has led to assembly issues and related safety concerns. The aforementioned issues combined with inefficiency due to wasted materials, have resulted in increased manufacturing costs.

SUMMARY OF THE INVENTION

The present invention provides a system which addresses the shortcomings of current design solutions for duplex actuation harnesses for motor vehicle airbag, occupant restraint systems. The disclosed system provides for efficient design and assembly of dual stage restraint initiator systems and can be applied to activate a variety of "smart" restraint systems. The efficient, novel design of the duplex actuation harness allows for a single harness to be adapted to various systems while limiting material cost and system complexity.

DETAILED DESCRIPTION OF THE DRAWINGS

DETAILED DESCRIPTION OF THE PRESENTLY PREFERRED EMBODIMENTS

Figure 1:
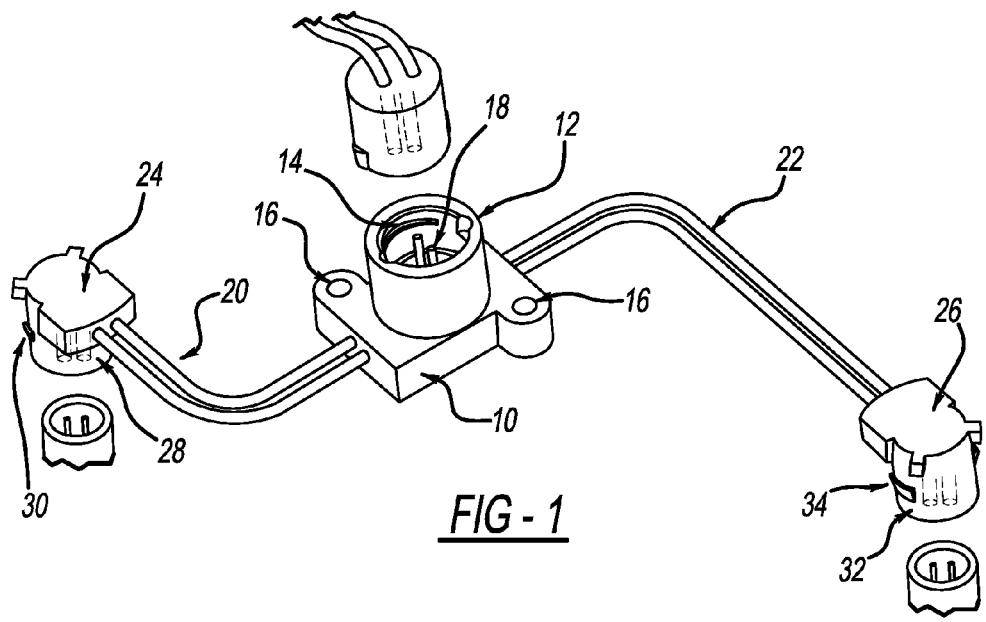
FIG. 1 is a pictorial view of a duplex firing harness assembly for motor vehicle occupant restraint systems in accordance with this invention.

Referring to FIG. 1, a duplex firing electrical harness for duplex actuation of motor vehicle occupant restraint systems is illustrated. From the preferred embodiment of the present invention, a connector housing 10 is shown having a harness ECU connector 12 for connection to a vehicle ECU connector 13 with a locking collar 14 and mounting holes 16 to affix the connector housing 10 to a vehicle airbag module (for example). ECU connector 12 connects with a vehicle restraint system controller (not shown) via (at least) a pair of conductors in a conductor cable. The connector housing 10 incorporates an ECU terminal 18 to transfer current bi-directionally to activate two airbag initiators or other devices in a duplex system through a first pair of conducting wires 20 and a second pair of conducting wires 22 to the first and second device, respectively. The first pair of conducting wires 20 and the second pair of conducting wires 22 are disposed in a first device connector 24 for connection to a first device 25 and a second device connector 26 for connection to a second device 27 respectively at their outermost extent away from the connector housing 10. The first device connector 24 includes a first device terminal 28 and first locking clip 30 for electrical and physical connection of the first pair of conducting wires 20 to the first device 25. The second device connector 26 includes a second device terminal 32 and second locking clip 34 for electrical and physical connection of the second pair conducting wires 22 to the second device 27.

Figure 2:
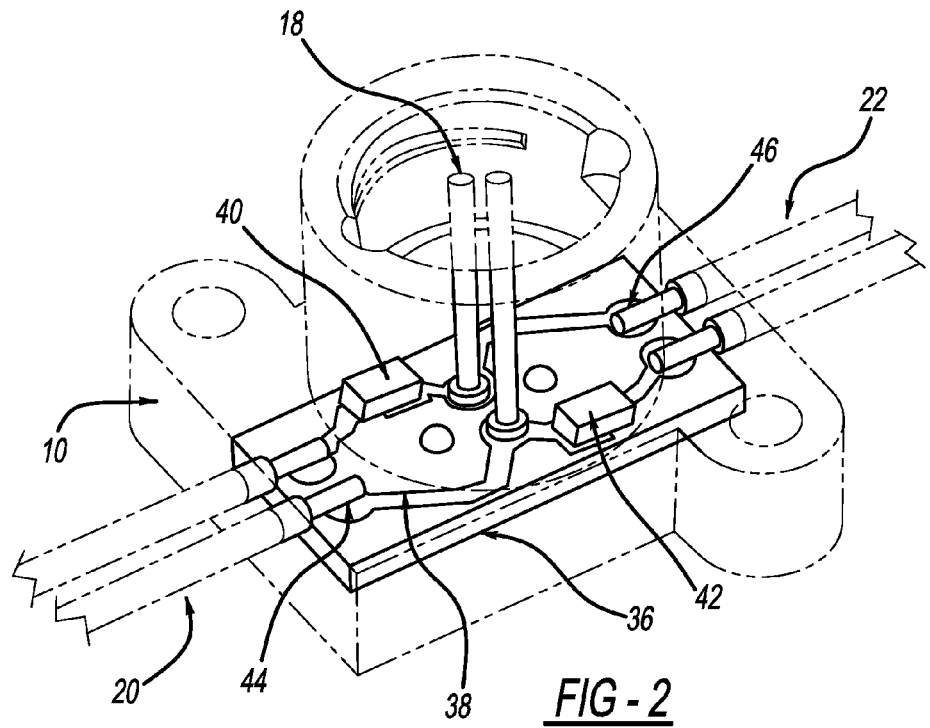
FIG. 2 depicts a partially transparent pictorial view of the connector housing to show the control circuitry of the wiring harness including a duplex circuit board with current path controlling diodes.

Referring to FIG. 2, the connector housing 10 is rendered to be partially transparent to illustrate the duplex printed circuit board (PCB) 36 disposed within. Other forms of circuitry can be used which do not use a conventional printed circuit board. The ECU terminal 18 attaches to conductive PCB traces 38 (or other forms of conductors) on the duplex PCB 36 to transfer current to the first and second device. The duplex PCB 36 further includes a first diode 40 and second diode 42 to restrict current to the second device 27 and first device 25, respectively. The duplex PCB 36 also includes first device PCB terminals 44 and second device PCB terminals 46 for attachment to the first pair of conducting wires 20 and second pair of conducting wires 22, respectively. These electrical connections facilitate the transfer of current from the ECU terminal 18 through the conductive PCB traces 38 to complete the circuit to the first and second device as part of a duplex system.

Figure 3:
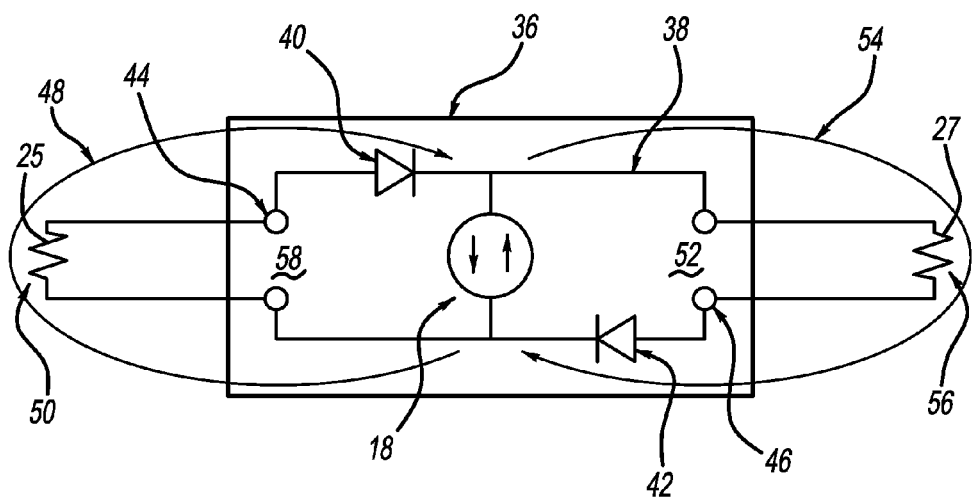
FIG. 3 illustrates a simplified circuit schematic of the duplex circuit board and blocking diodes combined with a device or initiator.

Referring to FIG. 3, a simplified circuit schematic of the duplex PCB 36 is shown to further detail the function of the duplex circuit. When sufficient current is applied to the ECU terminal 18 in the direction of the first current path 48, the first device initiator 50 (which corresponds to first device 25) is activated. In order to prevent activation of the second device 27 during first device 25 operation, current flow through the second squib loop 52 is limited by the second diode 42. When sufficient current is applied to the ECU terminal 18 in the direction of the second current path 54, the second device initiator 56 (which corresponds to second device 27) is activated. To prevent activation of the first device 25 during second device 27 operation, the current flow through the first squib loop 58 is limited by the first diode 40. In addition to simple diodes used as nonlinear components 40 and 42, other potential components added to isolate individual squibs may include, standard p-n junction diodes, Schottky diodes, bipolar junction transistors (BJT), insulated gate bipolar transistors (IGBT), MOSFETs, or other non-linear components.

Some of the benefits of the disclosed invention are decreased complexity in assembly and material cost while maintaining efficient system activation. Though the disclosed embodiment teaches of a duplex firing harness assembly that relates directly to dual-stage inflator systems, it will be obvious to those skilled in the art that other embodiments may include, but are not limited to a single stage inflator and a tether release, a dual stage inflator (with two initiator connector pockets), and a single stage inflator with an active vent. Other systems include pretensioners with micro-gas generators, and many others. For example, it is contemplated that the simultaneous or near simultaneous activation of two devices as part of a duplex system may be achieved without a significant time delay between their activations. Further, the invention allows for diagnostic testing at reduced current levels to ensure performance. The electrical harness also has the added benefit of potential compatibility with existing ECU wiring connectors that were designed for single state devices.

The disclosed duplex firing harness assembly allows for various applications with similar embodiments providing diminished cost and increased quality control by applying flexible designs for multiple applications. An example of another embodiment includes a similar harness assembly to that previously disclosed, but the first device connector 24 and first pair of conducting wires 20 are merged with the connector housing 10. In this embodiment, the first device 25 attaches directly to the connector housing 10 allowing for efficient device connection for a duplex system activation with a topology wherein the first device 25 is located near the connector housing 10.

While the present invention has been described with reference to specific exemplary embodiments, it will be evident that various modifications and changes may be made to these embodiments without departing from the broader scope of the invention as set forth in the claims. Accordingly, the specification and drawings are to be regarded in an illustrative rather than a restrictive sense.

What is claimed is:

1. An electrical harness assembly for use with a restraint system for activation of devices for vehicle restraint systems having an ECU connector connected with a restraint system controller by a connecting cable, the assembly comprising:
    a connector housing including a terminal connection configured to receive a first control signal in a first current direction and a second control signal in a second current direction opposite the first current direction from the ECU connector conductively connected to a circuit;
    the circuit defining a first and a second loop, each loop being defined as conductively connecting to the terminal connection, the first loop having a first electrical component limiting the flow of current only in the second current direction, and the second loop having a second electrical component only limiting the flow of current in the first current direction with respect to the terminal connection; and
    the first loop including a first electronic device attachment in series with the first electrical component and the second loop including a second electronic device attachment in series with the second electrical component.

2. The assembly of claim 1 wherein the electrical component is one or more of a diode, a p-n junction diode, a Schottky diode, a bipolar junction transistors, an insulated gate bipolar transistor, or a MOSFET.

3. The assembly of claim 1 wherein at least one of the first electronic device attachment and the second electronic device attachment electrically connect with at least one of an inflator, an initiator, a tether release, a pretensioner having a gas generator, or an active vent.

4. The assembly of claim 1 wherein both the first electronic device attachment and the second electronic device attachment are electrically connected with at least one of an inflator, an initiator, a tether release, a pretensioner having a gas generator, or an active vent.

5. The assembly of claim 1 wherein the connector housing is mounted to an airbag module.

6. The assembly of claim 1 wherein the circuit is integrated into the connector housing.

7. The assembly of claim 1 wherein the electrical harness assembly is for use with a duplex restraint system circuit.

8. The assembly of claim 1 wherein one of the first or second loop is a squib loop for an inflatable restraint system.

9. The assembly of claim 1 wherein both the first and the second loops are squib loops for an inflatable restraint system.

10. The assembly of claim 1 wherein the circuit is in the form of a printed circuit board.

11. The assembly of claim 1 wherein a first set of conductive wires is part of the first loop and extends between the first electronic device attachment and the connector housing, the first electronic device attachment and the connector housing being physically separated.

12. The assembly of claim 11 wherein a second set of conductive wires are part of the second loop and extends between the second electronic device attachment and the connector housing, the second electronic device attachment and the connector housing being physically separated.

13. An electrical harness assembly for use with a restraint system for duplex activation of devices for vehicle restraint systems having an ECU connector connected with a restraint system controller by a connecting cable, the assembly comprising:
   a connector housing including a terminal connection configured to receive a first control signal in a first current direction and a second control signal in a second current direction opposite the first current direction from the ECU connector conductively connected to a circuit;
   the circuit defining a first and a second loop, each loop being defined as conductively connecting to the terminal connection, the first loop having a first electrical component limiting the flow of current only in the second current direction, and the second loop having a second electrical component only limiting the flow of current in the first current direction with respect to the terminal connection;
   the first loop including a first electronic device attachment remotely mounted from the connector housing and connected therewith via a first set of conductor wires; and
   the second loop including a second electronic device attachment remotely mounted from the connector housing and connected therewith via a second set of conductor wires.

14. The assembly of claim 13 wherein the electrical component is one or more of a diode, a p-n junction diode, a Schottky diode, a bipolar junction transistors, an insulated gate bipolar transistor, or a MOSFET.

15. The assembly of claim 13 wherein at least one of the first electronic device attachment and the second electronic device attachment electrically connect with at least one of an inflator, an initiator, a tether release, a pretensioner having a gas generator, or an active vent.

16. The assembly of claim 13 wherein both the first electronic device attachment and the second electronic device attachment are electrically connected with at least one of an inflator, an initiator, a tether release, a pretensioner having a gas generator, or an active vent.

17. The assembly of claim 13 wherein the connector housing is mounted to an airbag module.

18. The assembly of claim 13 wherein one of the first or the second loop is a squib loop for an inflatable restraint system.

19. The assembly of claim 13 wherein both the first and the second loops are squib loops for an inflatable restraint system.

20. The assembly of claim 13 further defining the circuit comprising a duplex circuit board having conductive traces.

21. The assembly of claim 20 wherein the duplex circuit board is integrated into the connector housing.

* * * * *